United States Patent [19]
Lemke et al.

[11] Patent Number: 5,145,564
[45] Date of Patent: Sep. 8, 1992

[54] METHOD OF AND APPARATUS FOR PRODUCING ELECTRICALLY-CONDUCTIVE PROBE TIPS

[75] Inventors: Heiko Lemke, Hungen; Thomas Göddenhenrich; Hans-Peter Bochem, both of Jülich; Uwe Hartmann, Niederzier, all of Fed. Rep. of Germany

[73] Assignee: Forschungszentrum Julich GmbH, Julich, Fed. Rep. of Germany

[21] Appl. No.: 665,768

[22] Filed: Mar. 7, 1991

[30] Foreign Application Priority Data

Mar. 8, 1990 [DE] Fed. Rep. of Germany ....... 4007291

[51] Int. Cl.⁵ .............................. C25F 3/02; C25F 7/00
[52] U.S. Cl. .......................... 204/129.55; 204/224 M; 204/225; 204/272
[58] Field of Search ........... 204/129.1, 129.55, 224 M, 204/225, 129.4

[56] References Cited

U.S. PATENT DOCUMENTS

| | | | |
|---|---|---|---|
| 2,628,936 | 2/1953 | Albano | 204/129.55 |
| 2,773,024 | 12/1956 | Gurry | 204/129.55 |
| 3,556,953 | 1/1971 | Schulz | 204/129.55 |
| 4,375,396 | 3/1983 | Beggs | 204/129.55 |
| 5,035,780 | 7/1991 | Suzuki et al. | 204/129.55 |

FOREIGN PATENT DOCUMENTS

2532719 1/1977 Fed. Rep. of Germany .
3329482 3/1985 Fed. Rep. of Germany .

*Primary Examiner*—Donald R. Valentine
*Attorney, Agent, or Firm*—Herbert Dubno

[57] ABSTRACT

Probe tips are produced from electrically conductive wire by electrolytic machining of a zone of the wire above a free end utilizing a liquid electrolyte layer in contact with this zone, a ring electrode surrounding this zone, and a layer of an insulating fluid into which the free end extends. The insulating fluid can be air where the electrolyte is a membrane between layers of air above and below the membrane, or a body of a liquid insulator below the electrolyte layer where the insulator and the electrolyte form a bath.

10 Claims, 2 Drawing Sheets

METHOD OF AND APPARATUS FOR PRODUCING ELECTRICALLY-CONDUCTIVE PROBE TIPS

FIELD OF THE INVENTION

Our present invention relates to a method of and an apparatus for producing electrically-conductive probe tips by electrolytic erosion of a wire composed of electrically-conducting material.

BACKGROUND OF THE INVENTION

Electrically-conductive probe tips are utilized, for example, in power scanning microscopy, scanning channel microscopy, etc., as scanning needles with Van der Waals' alternating fields or in magnetic fields, or with tunnel probes for the measurement of the tunnel current. They may, of course, be used elsewhere, wherever fine measurements or inputs with electrical probes are required.

The characteristics of such probe tips will generally depend upon the application, but the probes must be fabricated, especially in scanning microscopy, with sufficient precision to provide the measurements necessary for the qualitative and quantitative evaluation of the scanning points. It is thus important to provide a method of producing such probe tips that the characteristics of the tips will be highly reproducible. It has been proposed heretofore to make such tips by electrolytic machining of the tip from an electrically conductive wire.

It is known, for instance, to connect a wire of electrically conductive material as an electrode and to immerse it in an electrolyte. The material of the wire is electrically eroded until the wire forms the probe tip.

These earlier systems are not as precise and reproducible as is desirable.

In this connection reference may be had to two German patent documents, DE-OS 25 32 719 and DE-OS 33 29 482.

OBJECTS OF THE INVENTION

It is, therefore, the principal object of the present invention to provide an improved method of making probe tips for the uses described and general probe applications, whereby drawbacks of earlier methods are avoided.

Another object of the invention is to provide a method of making such probe tips utilizing electrolytic erosion of electrically-conductive wire which provides fine probe tips with high precision an reproducibility.

Yet another object of the invention is to provide an improved apparatus for carrying out the method of the invention.

SUMMARY OF THE INVENTION

These objects and others which will become apparent hereinafter are attained, in accordance with the invention, in a method which comprises:

(a) inserting a wire of electrically-conductive and electrolytically-erodable material into an electrolytically effective liquid layer formed by an electrolyte solution and flanked by electrically insulating layers so that a zone on the wire is exposed to the liquid layer, the wire is guided in a region of the wire adjacent the zone, and a portion of the wire on an opposite side of the zone from the region forms a free end of the wire extending into one of the electrically insulating layers; and (b) electrolytically eroding the zone of the wire to progressively reduce a cross section of the wire in the zone until the free end is separated by the electrolytic eroding of the zone from the region, thereby forming a probe tip on the region.

The wire composed of the electrically-conducted and electrolytically-removable material is thus immersed at the zone at which the tip is to be formed, in an electrolytically-effective liquid layer comprised of an electrolyte solution, for example, 0.5 to 1 M NaOH, Geraline 67C (AGFA), 6 M NaCN and 2 M KOH, 50% aqueous $H_3PO_4$, or 75% $H_3PO_4$ saturated with $CrO_3$.

This liquid layer is surrounded by electrically-insulating material. The wire has a guided end and a free end between which the zone in which the tip is to be formed is provided and which is immersed in the electrolyte solution, both the guided end and the free end being received in the insulator so that only the aforementioned zone is exposed to the electrically-effected liquid and is in contact therewith while the free end of the wire extends into the insulating medium.

The electrolytic process progressively thins the zone of the air in contact with the electrolyte, thereby forming a thin tip from which the free end of the wire breaks away.

We have found that probe tips fabricated in this manner have at their tip ends very small radii of curvature and a highly uniform surface structure.

The tip characteristics are so reproducible that it is possible to use the tips as scanning needles or tunnel probes with the result that one can be assured of the formation of well-defined reproducible magnetic or electrical fields.

According to a feature of the invention, the wire is inserted from above into a bath in which the liquid layer overlies an insulating liquid layer of greater specific gravity than the electrolyte solution, the free end extending downwardly into the insulating liquid layer.

The electrolyte, which may be one of the aqueous solutions described above, can thus overlie a dielectric or insulating liquid such as $CCl_4$ or $CHBr_3$ having a higher specific gravity and forming the insulator. The wire is so introduced into the bath from above, that the free end hangs downwardly in the insulating layer.

The reproducibility of the process is enhanced by electrolytically eroding the wire against the annular or ring counterelectrode surrounding this zone and spaced therefrom. The electrolytically-effective liquid forms a closed region within the ring electrode in which the thickness reduction of the wire is carried out.

According to another feature of the invention, where the zone is surrounded by a ring electrode, the electrolyte solution spans the ring electrode in the form of a liquid membrane. For this membrane, the above-mentioned electrolyte solutions may be used although it is possible to add to these solutions gel-forming agents which can assist in retaining the integrity of the solution.

When the liquid is immersed in the two-layer bath previously described, the portion of the wire above the zone lies in air which acts as an insulator above the electrolyte layer. When a liquid membrane is employed and the wire is inserted into this membrane so that the free end of the wire extends below the membrane, the insulator or dielectric is formed by the air above and below the membrane.

In this latter process, the shape of the tip which is formed is dependent upon the thickness of the liquid membrane. With especially thin liquid layers, the tips which are formed are finer and the radii of curvature at the ends of the tips are smaller. Other effects on the tips will depend upon the applied voltage and the current density at which the electrolytic machining is carried out. It has been found to be advantageous to draw the free end of the wire away from the zone, e.g. by weighting the wire.

An apparatus for carrying out the method of the invention can comprise:

means forming an electrolytically effective liquid layer formed by an electrolyte solution and flanked by electrically insulating layers;

means for guiding a wire of electrically conductive and electrolytically erodable material into the liquid layer so that a zone on the wire is exposed to the liquid layer, the wire being guided in a region of the wire adjacent the zone, and a portion of the wire on an opposite side of the zone from the region forming a free end of the wire extending into one of the electrically insulating layers;

a counterelectrode spacedly juxtaposed with the zone and in contact with the liquid layer; and a source of electrolytic erosion current connected to the wire and the counterelectrode for electrolytically eroding the zone of the wire to progressively reduce a cross section of the wire in the zone until the free end is separated by the electrolytic eroding of the zone from the region, thereby forming a probe tip on the region.

Means can be provided for exerting traction on the free end in a direction away from this region.

Where the electrolyte layer is a liquid membrane, the ring electrode forms a frame across which the liquid film is spanned and which is surrounded by the air which acts as the insulator. Here as well the free end of the wire may be weighted.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
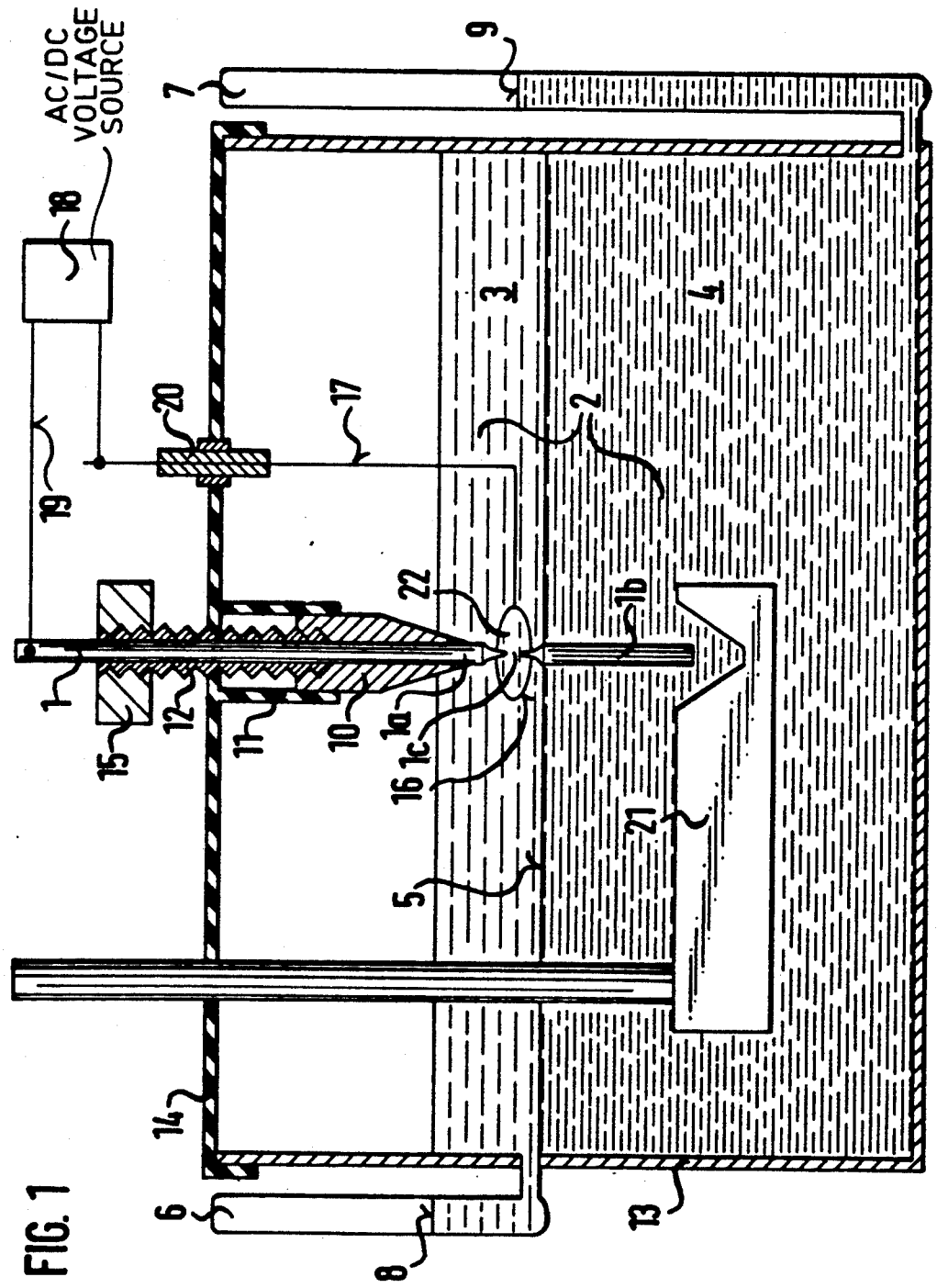
FIG. 1 is a diagrammatic cross sectional view illustrating one embodiment of an apparatus for producing probe tips according to the invention.

FIG. 1 schematically shows an apparatus for the electrolytic production of probe tips according to the invention in which a wire 1 of an electrically-conductive and an electrolytically-soluble material is immersed in a liquid bath 2. The two liquids of this bath are formed by an electrolyte solution 3 and an insulating liquid 4, the electrolyte solution 3 being superposed upon the dielectric 4. The insulting liquid 4 has a higher specific gravity than the electrolyte solution.

A liquid interface 5, between the electrolyte solution and the insulating liquid, can be positioned with the aid of sight tubes 6 and 7 communicating with an electrolyte and insulating liquids respectively. The heights of the liquid levels 8 and 9 in both of these communicating tubes provides a measure of the thickness of the electrolyte solution and insulating liquid layers and permits an adjustment of the position of the interface 5 at the desired level with respect to the workpiece constituted by the wire 1. The position of this interface can be indicated by the level 9 in the tube 7 which is slightly higher than the level of the interface 5, the difference accounting for the layer 3 upon the layer 4 and having the smaller specific gravity.

The wire 1 introduced into the liquid bath is guided in a holder 10 and thus has a chucked end 1a retained in the holder, a free end 1b immersed in the dielectric or insulator 4, and a zone 1c immersed in the electrolyte 3 which is subject to electrolytic machining.

The wire 1 has been shown with an exaggerated diameter in FIG. 1. In reality, the probe tips of the invention are formed from very thin wires with wire diameters of about 100 micrometers. Thus the wire shown in the drawing is highly distorted by comparison with its actual diameter in practice.

As noted, the end 1a is clamped tightly in the holder 10. The holder 10 is shiftable in a rail or guide 11 via a threaded spindle 12 which is threaded into the cover 14 of the housing 13 of the bath 2. A rotation of the adjustment nut 15 on the spindle permits the holder 10 to be moved up or down and thus positions the zone 1c properly in the electrolyte layer 3.

A ring electrode 16 surrounds the zone 1c in the electrolyte 3 and is connected by an electrical lead 17 traversing a feed-through insulator 20 to a voltage source 18 whose other pole is connected to the wire 1.

A collecting tray 21 is likewise immersed in the liquid bath 2 and can be shifted beneath the free end 1b of the wire 1 to collect this free end when it separates from the remainder of the wire in the formation of the tip.

When the ring electrode 16 and the wire 1 are connected to the opposite poles of the direct-current source 18 so as to electrolytically erode material from the wire into the electrolyte layer 22 between the ring electrode and the wire, the zone 1c is progressively and symmetrically reduced in diameter. The diameter reduction ultimately results in a tearing away of the free end 1b which is drawn downwardly by gravity, thereby leaving a probe tip in the holder 10. The free end is collected in the tray 21.

By way of a specific example, using a 0.5 molar sodium hydroxide solution as the electrolyte, carbon tetrachloride as the underlying insulator and a ring electrode 16 of platinum with a ring diameter $d=5$ mm, a tungsten wire having a starting diameter of 100 micrometers can be formed with a paraboloidal probe tip with a tip radius of about 10 nm.

Initially the tungsten wire is electrolytically etched using an alternating-current source at 18 until its thickness is reduced to 50 micrometers. A direct-current source is then substituted at 18 with the tungsten wire connected as the anode and the platinum ring electrode as the cathode. The remaining erosion takes place as an electrolytic polishing under these conditions with an applied voltage of 5 volts and an electrolytic current I of 25 mA. The surface of the probe tip is simultaneously polished.

Figure 2:
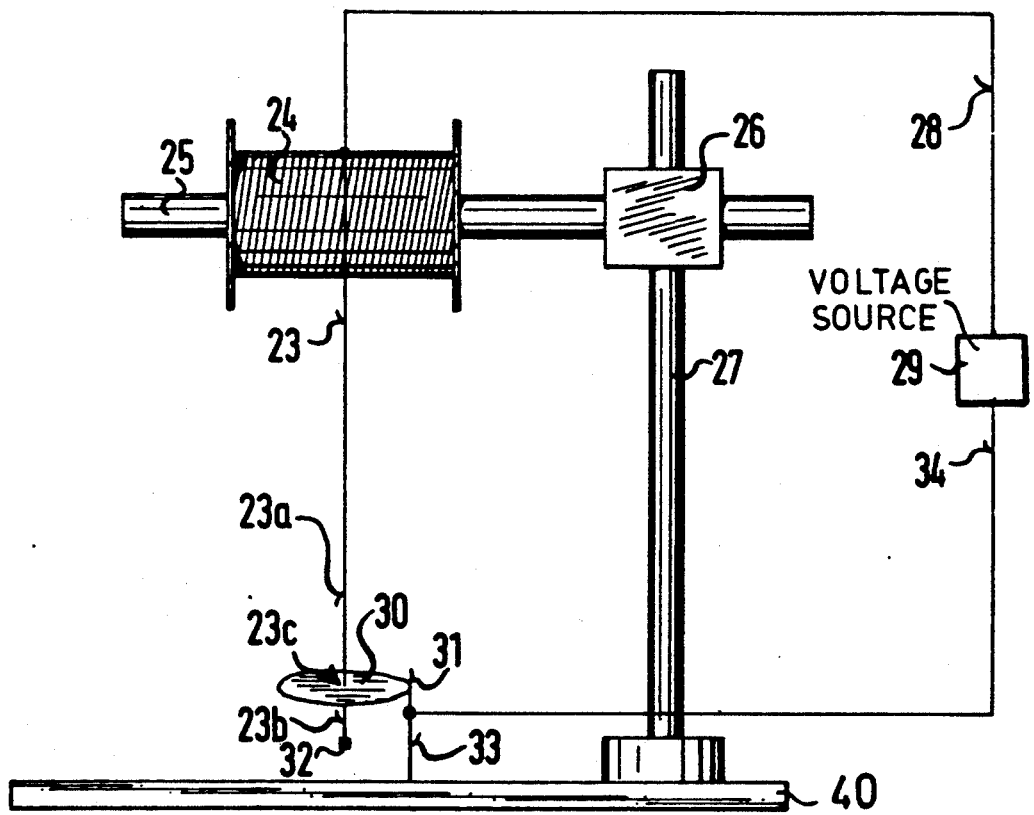
FIG. 2 is a diagrammatic view of another apparatus utilizing a liquid electrolyte membrane.

In FIG. 2 we have shown an apparatus for the electrolytic production of probe tips utilizing the same principle but wherein an electrolyte membrane between layers of air forms the electrolyte layer.

A wire 23 with a guided end 23a, a free end 23b and an electrolytic machining region 23c can be fed from a rotatable wire spool 24 by rotation of this spool about its axis 25 on a cross piece 26 of a post 27 rising from a base 40. The wire 23 is connected by an electrical lead 28 to a voltage source 29.

In the embodiment shown in FIG. 2, the wire 23 passes through a liquid membrane 23 spanning a ring electrode 31 and constituting an electrolyte solution. The free end 23b lies below the membrane 30 and is provided with a weight 32 which draws this free end downwardly. The region 23c is located within the membrane and the region 23a lies within the insulating blank formed by air by the membrane just as the free end 23b lies in the insulating layer of air below the membrane. The ring electrode 27 is connected by a lead 23 supported on the insulating base 40 via a conductive lead 34 to the other pole of the voltage source 29.

In this case, for the machining of the tungsten wire, a 0.3 molar sodium hydroxide electrolyte is used which spans the ring electrode 31 as the liquid membrane.

The ring diameter of the ring electrode, which is composed of platinum, can be 50 mm. The tungsten wire can have an initial thickness of 15 micrometers. The machining of the tungsten wire is effected by electrolytic polishing using the voltage and current described for the polishing and final machining step in connection with FIG. 1. The tungsten probe, which results when the free end 23b drops off, has a tip radius of curvature of 50 nm.

We claim:

1. A method of making an electrically conductive probe tip, comprising the steps of:
   (a) inserting a wire of electrically conductive and electrolytically erodible material into an electrolytically effective liquid layer formed by an electrolyte solution and flanked by electrically insulating layers so that a zone on said wire is exposed to said liquid layer, said wire is guided in a region of said wire adjacent said zone, and a portion of said wire on an opposite side of said zone from said region forms a free end of said wire extending into one of said electrically insulating layers; and
   (b) electrolytically eroding said zone of said wire to progressively reduce a cross section of said wire in said zone until said free end is separated by the electrolytic eroding of said zone from said region, thereby forming a probe tip on said region, said wire being inserted in step (a) from above into a bath in which said liquid layer overlies an insulating liquid layer of greater specific gravity than said electrolyte solution, said free end extending downwardly into said insulating liquid layer.

2. The method defined in claim 1 wherein said zone of said wire is electrolytically eroded by spacedly juxtaposing said zone with an annular counterelectrode and connecting an electrolytic erosion current source across said wire and said counterelectrode.

3. The method defined in claim 1, further comprising the step of drawing said free end away from said region during electrolytic erosion in step (b).

4. A method of making an electrically conductive probe tip, comprising the steps of:
   (a) inserting a wire of electrically conductive and electrolytically erodible material into an electrolytically effective liquid layer formed by an electrolyte solution and flanked by electrically insulating layers so that a zone on said wire is exposed to said liquid layer, said wire is guided in a region of said wire adjacent said zone, and a portion of said wire on an opposite side of said zone from said region forms a free end of said wire extending into one of said electrically insulating layers; and
   (b) electrolytically eroding said zone of said wire to progressively reduce a cross section of said wire in said zone until said free end is separated by the electrolytic eroding of said zone from said region, thereby forming a probe tip on said region, said zone of said wire being electrolytically eroded by spacedly juxtaposing said zone with an annular counterelectrode and connecting an electrolytic erosion current source across said wire and said counterelectrode.

5. The method defined in claim 4 wherein said layer is a liquid membrane spanning said counterelectrode and said insulating layers are air layers.

6. An apparatus for making an electrically conductive probe tip, comprising:
   means forming an electrolytically effective liquid layer formed by an electrolyte solution and flanked by electrically insulating layers;
   means for guiding a wire of electrically conductive and electrolytically erodible material into said liquid layer so that a zone on said wire is exposed to said liquid layer, said wire being guided in a region of said wire adjacent said zone, and a portion of said wire on an opposite side of said zone from said region forming a free end of said wire extending into one of said electrically insulating layers;
   a counterelectrode spacedly juxtaposed with said zone and in contact with said liquid layer;
   a source of electrolytic erosion current connected to said wire and said counterelectrode for electrolytically eroding said zone of said wire to progressively reduce a cross section of said wire in said zone until said free end is separated by the electrolytic eroding of said zone from said region, thereby forming a probe tip on said region; and means for exerting traction on said free end in a direction away from said region.

7. The apparatus defined in claim 6, wherein said means for exerting traction includes a weight attached to said free end.

8. An apparatus for making an electrically conductive probe tip, comprising:
   means forming an electrolytically effective liquid layer formed by an electrolyte solution and flanked by electrically insulating layers;
   means for guiding a wire of electrically conductive and electrolytically erodible material into said liquid layer so that a zone on said wire is exposed to said liquid layer, said wire being guided in a region of said wire adjacent said zone, and a portion of said wire on an opposite side of said zone from said region forming a free end of said wire extending into one of said electrically insulating layers;
   a counterelectrode spacedly juxtaposed with said zone and in contact with said liquid layer; and
   a source of electrolytic erosion current connected to said wire and said counterelectrode for electrolytically eroding said zone of said wire to progressively reduce a cross section of said wire in said zone until said free end is separated by the electrolytic eroding of said zone from said region, thereby forming a probe tip on said region, said layer forming part of a bath in which said liquid layer overlies an insulating liquid layer of greater specific gravity than said electrolyte solution, said wire being inserted from above into said bath with said free end extending downwardly into said insulating liquid layer.

9. An apparatus for making an electrically conductive probe tip, comprising:

means forming an electrolytically effective liquid layer formed by an electrolyte solution and flanked by electrically insulating layers;

means for guiding a wire of electrically conductive and electrolytically erodible material into said liquid layer so that a zone on said wire is exposed to said liquid layer, said wire being guided in a region of said wire adjacent said zone, and a portion of said wire on an opposite side of said zone from said region forming a free end of said wire extending into one of said electrically insulating layers;

a counterelectrode spacedly juxtaposed with said zone and in contact with said liquid layer; and a source of electrolytic erosion current connected to said wire and said counterelectrode for electrolytically eroding said zone of said wire to progressively reduce a cross section of said wire in said zone until said free end is separated by the electrolytic eroding of said zone from said region, thereby forming a probe tip on said region, said counterelectrode being a ring electrode surrounding said zone.

10. The apparatus defined in claim 9 wherein said layer is a liquid membrane spanning said counterelectrode and said insulating layers are air layers.

* * * * *